(12) United States Patent
Beld et al.

(10) Patent No.: US 7,607,973 B1
(45) Date of Patent: Oct. 27, 2009

(54) HIGH YIELD BACON COMB

(75) Inventors: Julian John Beld, Lodi, WI (US);
Anthony F. Scribner, Waunakee, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 948 days.

(21) Appl. No.: 10/947,468

(22) Filed: Sep. 22, 2004

(51) Int. Cl.
*A22B 7/00* (2006.01)

(52) U.S. Cl. .................................. 452/193

(58) Field of Classification Search ............ None
See application file for complete search history.

(56) References Cited

U.S. PATENT DOCUMENTS

| | | | |
|---|---|---|---|
| 935,171 A | 9/1909 | Stark et al | |
| 974,200 A | 11/1910 | Stark et al | |
| 998,286 A | 7/1911 | Fisher | |
| 1,825,879 A | 10/1931 | Louthian | |
| 1,863,743 A | 6/1932 | Burns | |
| 1,936,380 A | 11/1933 | Lalumier et al. | |
| 1,967,870 A | 7/1934 | Covey | |
| 2,061,937 A | 11/1936 | Fay | |
| 2,412,233 A * | 12/1946 | Tominello | 452/193 |
| 2,461,374 A | 2/1949 | Custer | |
| 2,470,878 A | 5/1949 | Tate | |
| 2,680,522 A | 6/1954 | Temple | |
| 2,946,455 A | 7/1960 | Meyers | |
| 3,090,990 A * | 5/1963 | Graper | 452/193 |
| 3,363,544 A | 1/1968 | Eriksen | |
| 3,501,015 A | 3/1970 | Behles | |
| 3,602,370 A | 8/1971 | Jerch et al | |
| 3,887,079 A * | 6/1975 | Crew | 211/118 |
| 4,029,212 A * | 6/1977 | Uadiski | 211/113 |
| 4,106,174 A | 8/1978 | Ilines | |
| 4,172,305 A * | 10/1979 | Henebry et al. | 452/193 |
| 4,182,004 A | 1/1980 | Haring, Jr. | |
| 4,278,177 A * | 7/1981 | Fahmi | 211/116 |
| 4,465,313 A | 8/1984 | Val | |
| 4,615,077 A | 10/1986 | Beebe | |
| 4,863,043 A * | 9/1989 | Bowen | 211/113 |
| 5,052,975 A | 10/1991 | Handel | |
| 5,100,365 A | 3/1992 | Johnson | |
| 5,188,241 A | 2/1993 | Kobza et al. | |
| 5,334,088 A | 8/1994 | Le Normand et al. | |
| 5,423,721 A * | 6/1995 | Roush et al. | 452/193 |
| 5,669,810 A | 9/1997 | Ware et al. | |
| 5,848,716 A * | 12/1998 | Waranius | 211/189 |
| 5,862,924 A * | 1/1999 | Dumont | 211/85.7 |
| 5,938,522 A | 8/1999 | Jagusch et al. | |
| 6,398,086 B1 * | 6/2002 | Bennett | 223/87 |
| 6,505,108 B2 | 1/2003 | Bodie et al. | |
| 6,506,108 B1 | 1/2003 | Jagusch | |
| D568,916 S | 5/2008 | Beld et al. | |
| 2006/0099901 A1 | 5/2006 | Jagusch | |
| 2006/0199488 A1 | 9/2006 | Niemiec | |

* cited by examiner

*Primary Examiner*—Thomas Price
(74) *Attorney, Agent, or Firm*—Andrus, Sceales, Starke & Sawall, LLP

(57) ABSTRACT

A bacon comb hangs a bacon belly in a vertical position for processing and has laterally extending hooks engaging and supporting both the primary lean muscle and the secondary lean CT muscle at the top end of the bacon belly to prevent drop-away of the secondary lean CT muscle from the primary lean muscle, to increase the number of bacon slices per bacon belly meeting #1 grade criteria.

4 Claims, 5 Drawing Sheets

HIGH YIELD BACON COMB

BACKGROUND AND SUMMARY

The invention relates to bacon combs for hanging bacon bellies in a vertical position for processing.

Bacon combs or hangers are known in the prior art. The comb has an upper hook or hanger for hanging on a rack, such as a conveyor, dolly truck rod, or the like. The comb has a plurality of lower hooks extending laterally therefrom for engaging and supporting a bacon belly in a vertical position for processing, e.g. cooking, smoking, etc.

The present invention provides an improved bacon comb increasing the yield of bacon slices of #1 grade per bacon belly.

DETAILED DESCRIPTION

Figure 1:
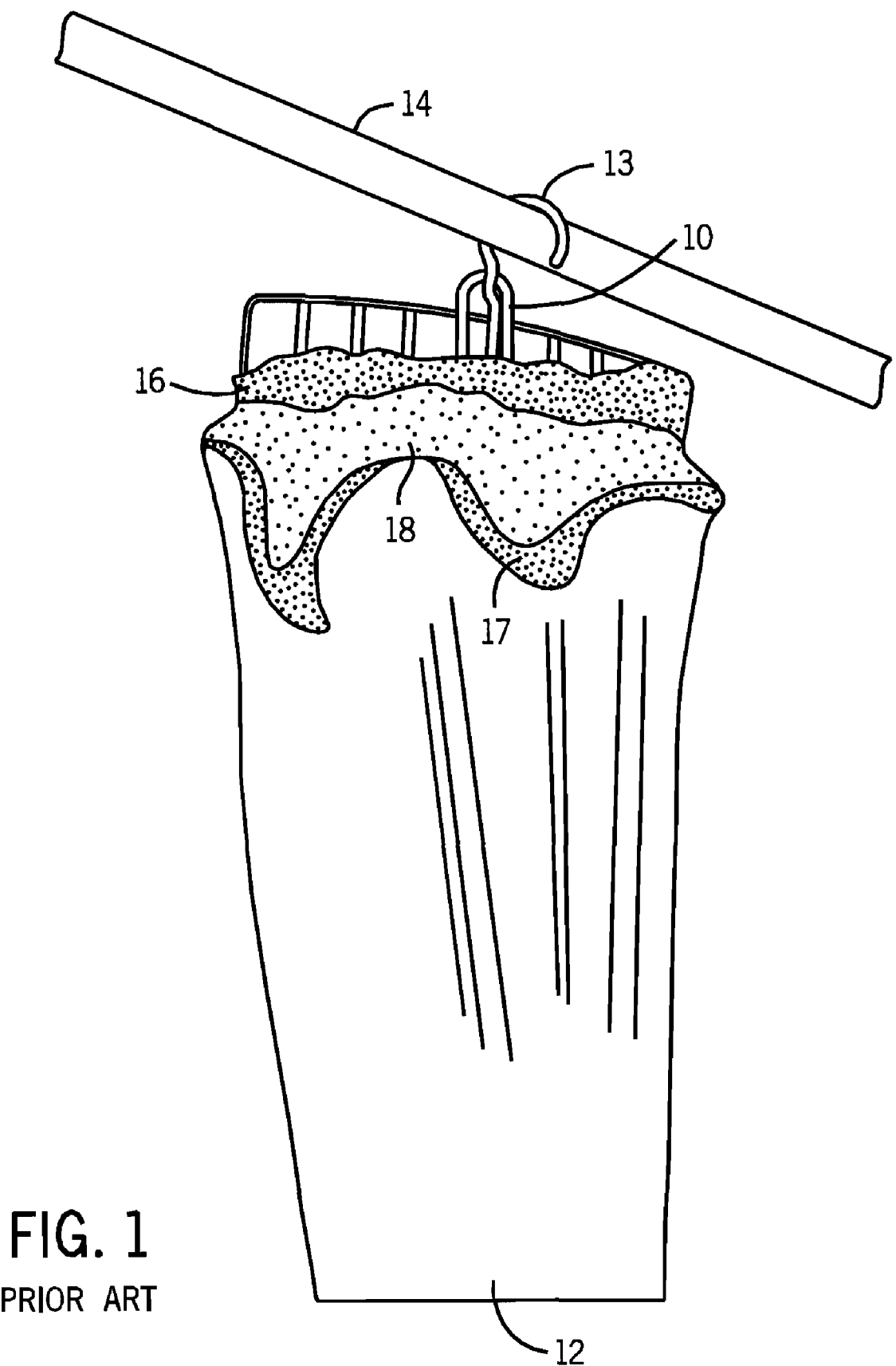
FIG. 1 shows a bacon comb known in the prior art supporting a bacon belly.
Figure 2:
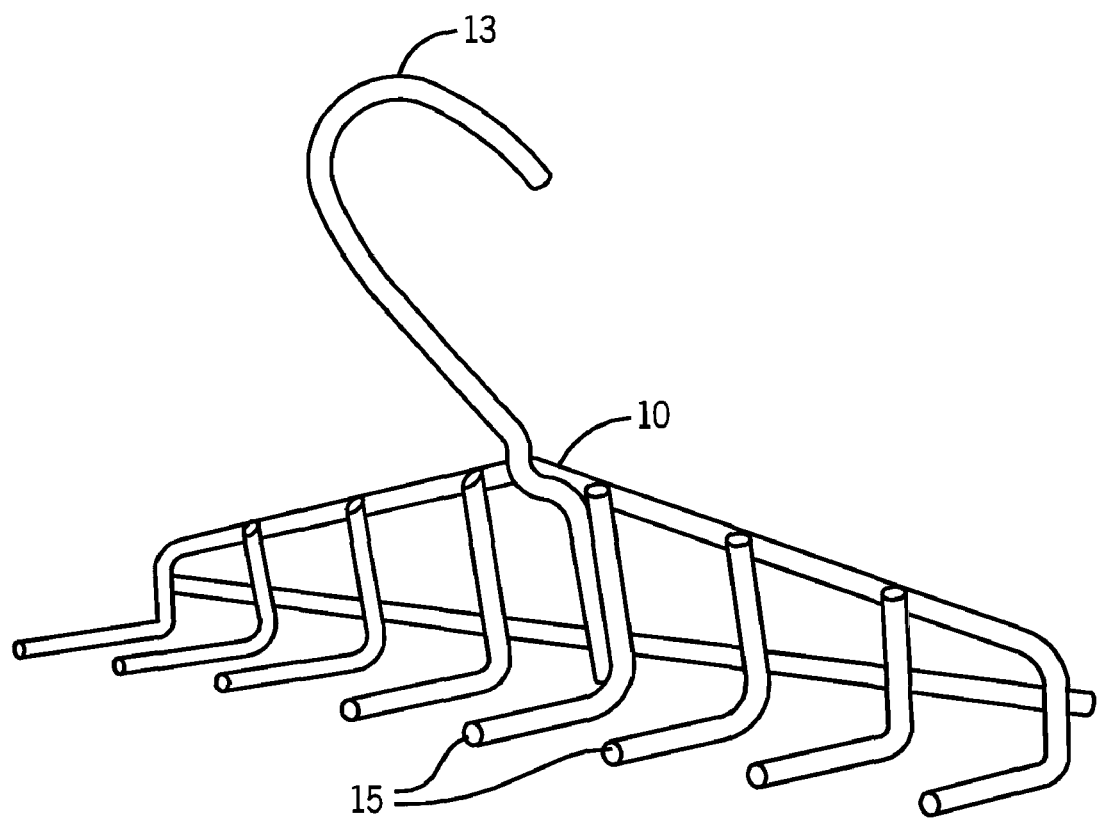
FIG. 2 is a perspective view of the comb of FIG. 1.

FIGS. 1 and 2 show a bacon comb 10 known in the prior art for hanging a bacon belly 12 in a vertical position for processing, e.g. cooking and/or smoking. The comb has an upper hook or handle 13 for hanging from a rack 14, such as a conveyor, dolly truck rod, or the like. The comb has a plurality of lower hooks 15 extending laterally therefrom to engage and support bacon belly 12.

The bacon belly has a primary lean muscle 16 and a secondary lean CT (cutaneous trunci) muscle 17 laterally spaced from primary lean muscle 16 by fat 18 therebetween. Hooks or prongs 15 attach to the ham or flank end of the bacon belly to support its 12 to 14 pounds vertically during processing. The operator inserts the comb from the primary lean muscle side of the belly. From the operator's viewpoint, the secondary lean CT muscle is hidden below the primary muscle on the opposite or skin side of the belly, making it difficult for the operator to ensure that the secondary lean CT muscle is hooked and supported by the comb. The result of not supporting the secondary lean CT muscle is that during heat processing this muscle relaxes and drops away from primary muscle 16, known as drop-away. FIG. 1 shows this drop-away of secondary lean CT muscle 17 from primary lean muscle 16 at the top end of the bacon belly.

The noted drop-away is undesirable because it reduces yield of #1 grade bacon slices. After the noted processing, the bacon belly is sliced, in a horizontal plane in the orientation of FIG. 1. A #1 grade is established by the length of secondary lean CT muscle 17 in the individual slice, namely 2 to 4 inches visible. If the slices do not meet this measurement requirement, they are downgraded to #2 grade, which has lower market value. If the top end of the belly experiences the noted drop-away, then the top slices will not have the requisite secondary lean CT muscle measurement, and thus will not achieve a #1 grade. This results in a lower total number of slices per belly that meet the #1 grade criteria.

Figure 3:
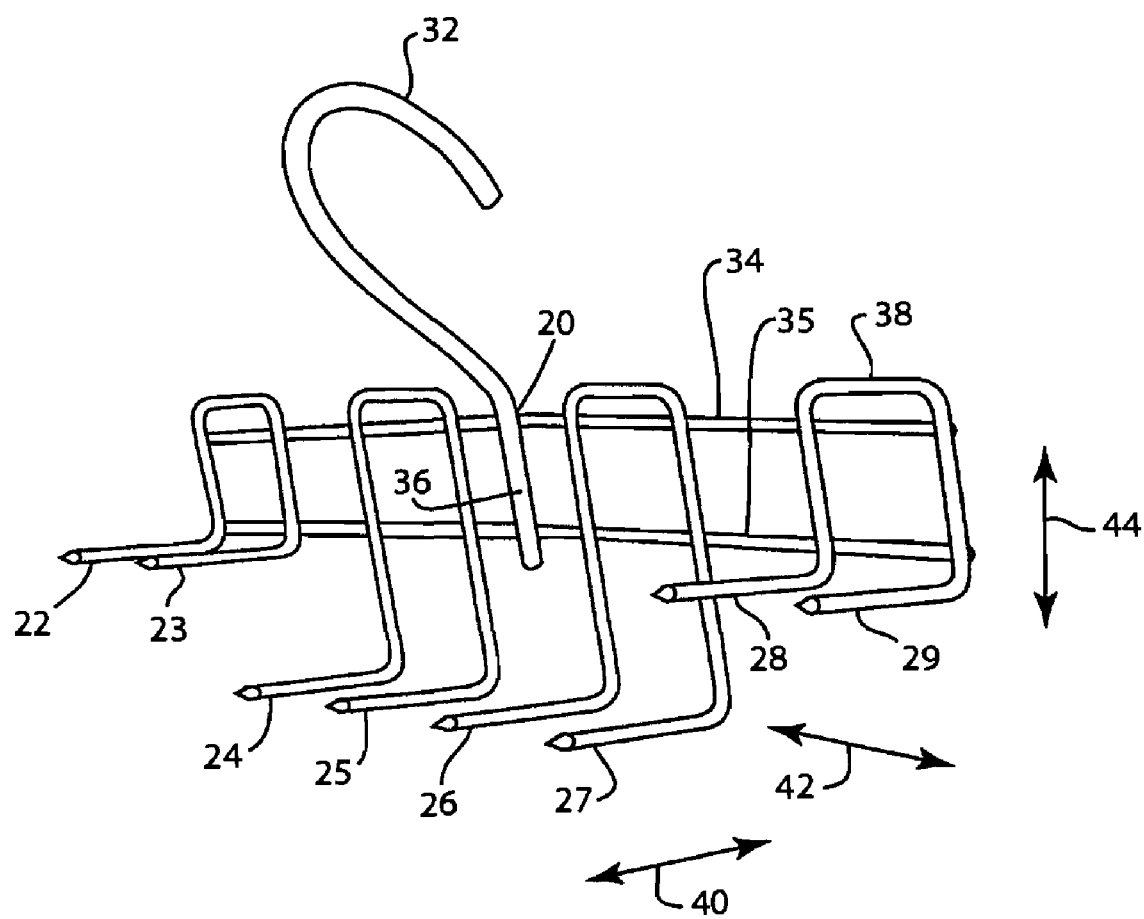
FIG. 3 is a perspective view of a bacon comb in accordance with the present invention.
Figure 4:
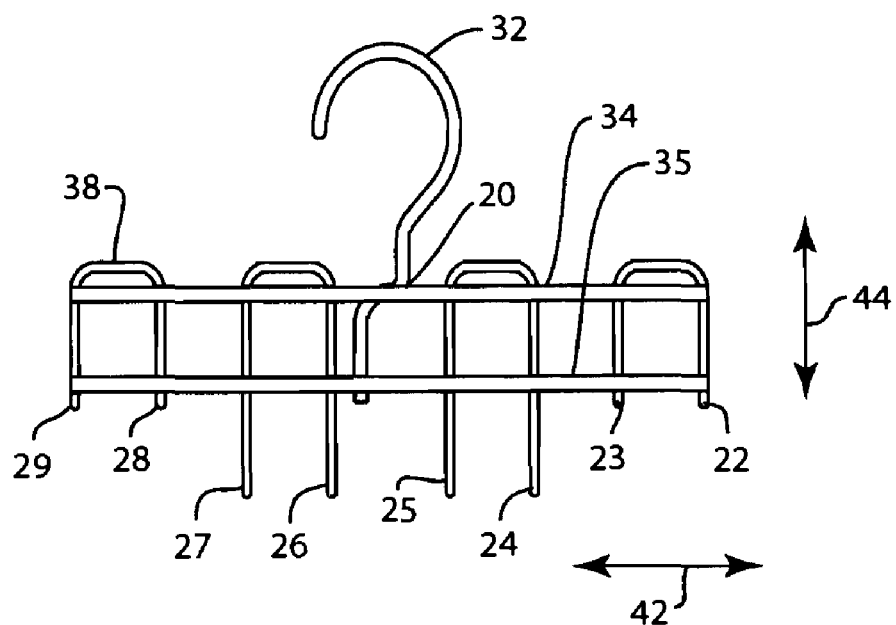
FIG. 4 is a side elevation view of the bacon comb of FIG. 3.
Figure 5:
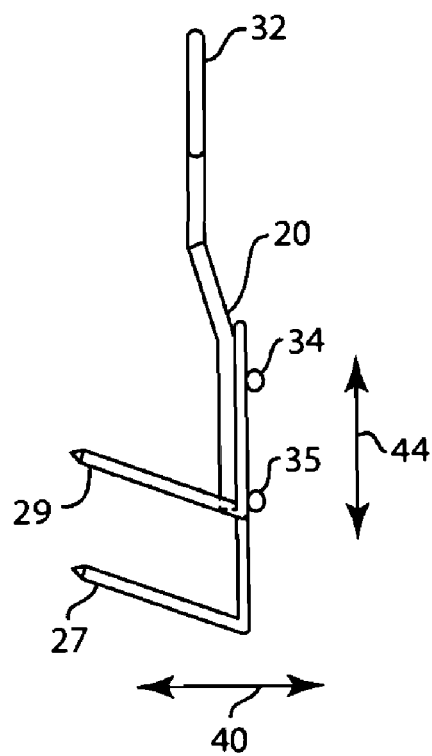
FIG. 5 is an end elevation view of the bacon comb of FIG. 3.

The present disclosure provides a bacon comb 20, FIG. 3, having a plurality of laterally extending hooks 22-29 engaging and supporting both the primary lean muscle and the secondary lean CT muscle at the top end of the bacon belly to prevent drop-away of the secondary lean CT muscle from the primary lean muscle at the top end, to increase the number of bacon slices per bacon belly meeting the #1 grade criteria. It has been found that yield is significantly increased when the hooks are provided in a two-tier hook pattern having at least a first set of one or more hooks such as 22-23 engaging the bacon belly at a first vertical elevation therealong, and at least a second set of one or more hooks such as 24-27 engaging the bacon belly at a second vertical elevation therealong lower than the first vertical elevation, FIGS. 3-6.

Comb 20 has an upper hook or handle 32 for hanging on a rack, as in the prior art. The comb has a grid or framework 34, 35 welded to the stem 36 of upper hook or handle 32. The lower hooks 22-29 are welded to framework 34, 35 and may be provided in pairs connected by an upper inverted U-shaped bend, e.g. upper inverted U-shaped bend 38 connecting hook pair 28, 29. Handle 32, including stem 36, and framework 34, 35 are preferably 3/16 inch diameter stainless steel round bar stock wire, and hooks 22-29 are preferably 1/8 inch diameter stainless steel round bar stock wire.

Hooks 22-29 extend laterally along a first lateral direction 40 to engage the bacon belly. First set of hooks 22-23, second set of hooks 24-27, and third set of hooks 28-29 are laterally spaced from each other along a second lateral direction 42 transverse to first lateral direction 40. Each of the noted first and second lateral directions 40 and 42 extends transversely to vertical direction 44. First set of hooks 22-23 and third set of hooks 28-29 engage the bacon belly at the noted first vertical elevation therealong and are laterally spaced along the noted second lateral direction 42 on distally opposite lateral sides of the second set of hooks 24-27. The second set of hooks 24-27 is laterally between and vertically below the noted first and third sets of hooks. Each of hooks 22-29 preferably extends laterally along the noted first lateral direction 40 and also angle upwardly, FIG. 5.

Figure 6:
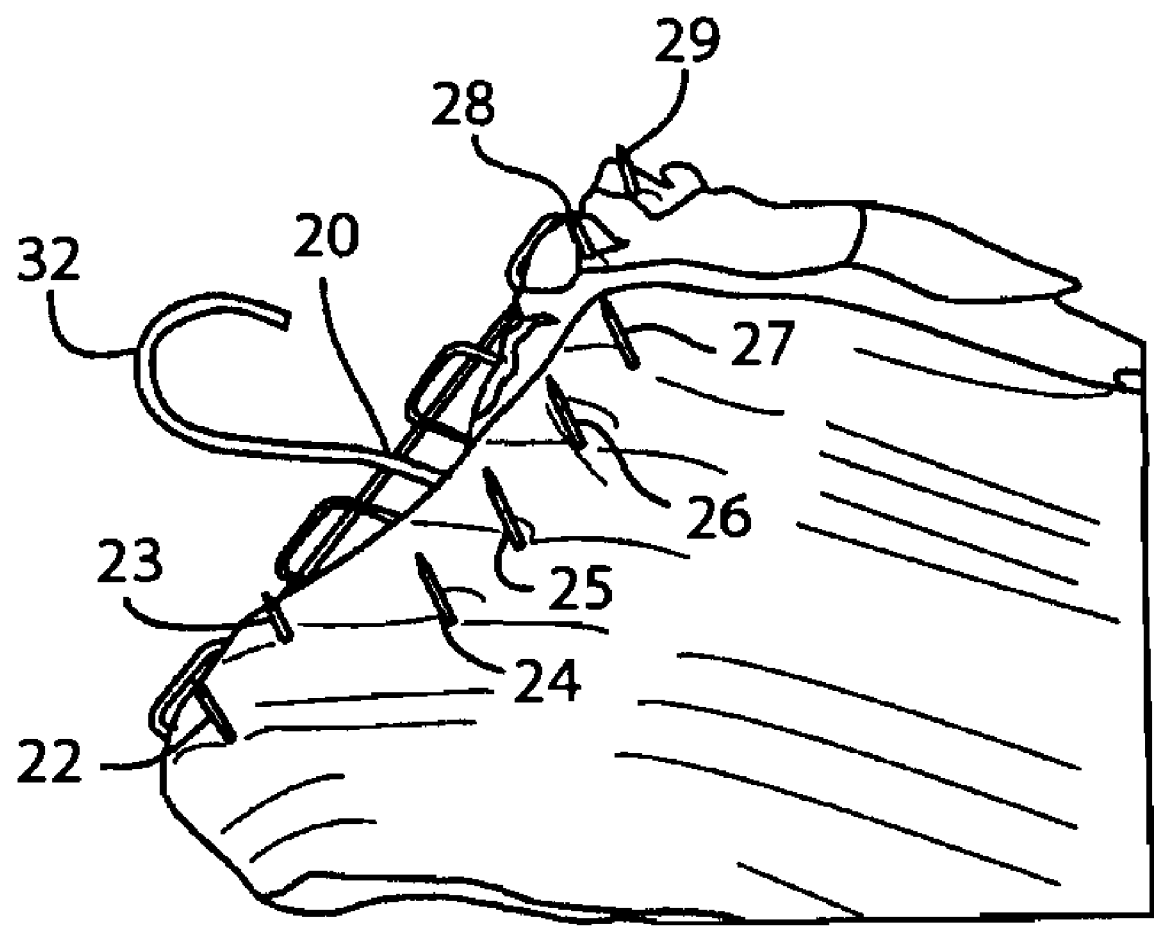
FIG. 6 shows a bacon belly hooked on the bacon comb of FIG. 3.

FIG. 6 shows comb 20 engaging a bacon belly. Hooks 22-29 are provided in the noted two-tier hook pattern, with first set of hooks 22-23 and third set of hooks 28-29 engaging the bacon belly at a first vertical elevation therealong, and second set of hooks 24-27 engaging the bacon belly at a second vertical elevation therealong lower than the noted first vertical elevation.

The table below shows the results of field tests conducted using the prior art comb 10 shown in FIGS. 1 and 2, and the present comb 20 shown in FIGS. 3-6. The units are in pounds (lbs.). Referring to the middle column using prior art comb 10, beginning with a net chilled weight 673 lbs., the yield was 549 lbs. of Grade #1, 45.75 lbs. of Grade #2, 70 lbs. of ends and pieces, for a total weight of 664.75 lbs., and a percentage yield of #1 grade of 81.5%. Referring to the right hand column for the present comb 20, beginning with a net chilled weight of 659 lbs., the yield was 561 lbs. of Grade #1, 16.5 lbs. of Grade #2, 75 lbs. of ends and pieces, for a total weight of 652.5 lbs., providing a percent yield of #1 grade of 85.1%. It is seen, that even though the initial starting net chilled weight for comb 20 (659 lbs.) was less than the initial starting net chilled weight for comb 10 (673 lbs.), comb 20 still yielded a higher weight of #1 grade bacon slices (561 lbs. vs. 549 lbs.). It is further noted that the percentage yield of #1 grade was significantly higher for comb 20 vs. comb 10, namely 85.1% vs. 81.5%. Comb 20 increases the percentage of bellies that have secondary lean CT muscles supported, and therefore results in a higher percentage of #1 grade product over a production run, i.e. increases the number of bacon slices per bacon belly meeting #1 grade criteria.

|  | Comb 10 | Comb 20 |
| --- | --- | --- |
| Net Chilled Weight | 673 | 659 |
| Grade #1 | 549 | 561 |
| Grade #2 | 45.75 | 16.5 |
| Ends & Pieces | 70 | 75 |
| Total Wt | 664.75 | 652.50 |
| #1 Grade Yield % | 81.5 | 85.1 |

It is recognized that various equivalents, alternatives, and modifications are possible within the scope of the appended claims.

What is claimed is:

1. A bacon comb for hanging a bacon belly in a vertical position for processing, said bacon belly having a primary lean muscle and a secondary lean CT (cutaneous trunci) muscle laterally spaced from said primary lean muscle by fat therebetween, said comb comprising a plurality of laterally extending hooks engaging and supporting said primary lean muscle and said secondary lean CT muscle at the top end of said bacon belly to prevent drop-away of said secondary lean CT muscle from said primary lean muscle at said top end, to increase the number of bacon slices per bacon belly meeting #1 grade criteria, wherein said hooks comprise a two-tier hook pattern comprising a first set of one or more hooks engaging said bacon belly at a first vertical elevation therealong, and a second set of one or more hooks engaging said bacon belly at a second vertical elevation therealong lower than said first vertical elevation, wherein said hooks extend laterally along a first lateral direction to engage said bacon belly, and wherein said first and second sets of hooks are laterally spaced from each other along a second lateral direction transverse to said first lateral direction, each of said first and second lateral directions extending transversely relatively to vertical, and comprising a third set of one or more hooks engaging said bacon belly at said first vertical elevation therealong, said first and third sets of hooks being laterally spaced along said second lateral direction on distally opposite lateral sides of said second set of hooks, said second set of hooks being laterally between and vertically below said first and third sets of hooks.

2. The bacon comb according to claim 1 wherein one or more hooks of at least one of said sets extends laterally along said first lateral direction and also angle upwardly.

3. A bacon comb for hanging a bacon belly in a vertical position for processing, said comb comprising a plurality of laterally extending hooks, said hooks comprising a two-tier hook pattern comprising a first set of one or more hooks engaging said bacon belly at a first vertical elevation therealong, and a second set of one or more hooks engaging said bacon belly at a second vertical elevation therealong lower than said first vertical elevation, wherein said hooks extend laterally along a first lateral direction to engage said bacon belly, and wherein said first and second sets of hooks are laterally spaced from each other along a second lateral direction transverse to said first lateral direction, each of said first and second lateral directions extending transversely relatively to vertical, and comprising a third set of one or more hooks engaging said bacon belly at said first vertical elevation therealong, said first and third sets of hooks being laterally spaced along said second lateral direction on distally opposite lateral sides of said second set of hooks, said second set of hooks being laterally between and vertically below said first and third sets of hooks.

4. The bacon comb according to claim 3 wherein one or more hooks of least one of said sets extends laterally along said first lateral direction and also angle upwardly.

* * * * *

UNITED STATES PATENT AND TRADEMARK OFFICE
CERTIFICATE OF CORRECTION

| | | |
|---|---|---|
| PATENT NO. | : 7,607,973 B1 | Page 1 of 1 |
| APPLICATION NO. | : 10/947468 | |
| DATED | : October 27, 2009 | |
| INVENTOR(S) | : Beld et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1435 days.

Signed and Sealed this

Twelfth Day of October, 2010

David J. Kappos
*Director of the United States Patent and Trademark Office*